United States Patent
Arakawa et al.

(10) Patent No.: US 7,874,214 B2
(45) Date of Patent: Jan. 25, 2011

(54) VIBRATION STATE DETECTING METHOD AT MACHINING STAGE OF WORK AND/OR TOOL

(75) Inventors: Hiroshi Arakawa, Fukui (JP); Kouichi Amaya, Fukui (JP); Masaru Fujita, Fukui (JP)

(73) Assignee: Matsuura Machinery Corporation, Fukui-shi, Fukui (JP)

( * ) Notice: Subject to any disclaimer, the term of this patent is extended or adjusted under 35 U.S.C. 154(b) by 580 days.

(21) Appl. No.: 12/014,305

(22) Filed: Jan. 15, 2008

(65) Prior Publication Data

US 2008/0271530 A1  Nov. 6, 2008

(30) Foreign Application Priority Data

May 1, 2007  (JP)  ............................. 2007-121003

(51) Int. Cl.
  *B06B 3/00* (2006.01)
(52) U.S. Cl. ............................. 73/663; 73/579; 73/646
(58) Field of Classification Search ............... 73/577, 73/579, 584, 600, 602, 627, 645, 646, 649, 73/663
  See application file for complete search history.

(56) References Cited

U.S. PATENT DOCUMENTS

| | | | | |
|---|---|---|---|---|
| 3,634,664 A * | 1/1972 | Valek | ........................ | 318/561 |
| 3,681,978 A | 8/1972 | Mathias et al. | | |
| 3,758,758 A * | 9/1973 | Games et al. | ................ | 702/56 |
| 4,087,890 A * | 5/1978 | Ishizuka et al. | ............ | 29/27 C |
| 4,448,077 A * | 5/1984 | Sato et al. | ..................... | 73/660 |
| 4,520,674 A * | 6/1985 | Canada et al. | ................ | 73/660 |
| 4,562,392 A * | 12/1985 | Davis et al. | ................. | 318/572 |
| 4,612,620 A * | 9/1986 | Davis et al. | ................. | 702/184 |
| 4,698,773 A * | 10/1987 | Jeppsson | ..................... | 700/160 |
| 4,800,512 A * | 1/1989 | Busch | ........................ | 702/182 |
| 5,374,884 A * | 12/1994 | Koren et al. | ................ | 318/632 |
| 5,493,763 A * | 2/1996 | Yamanaka et al. | .......... | 29/27 C |
| 5,808,903 A * | 9/1998 | Schiltz et al. | ................. | 702/56 |
| 5,847,658 A * | 12/1998 | Irie et al. | ..................... | 340/683 |
| 6,006,164 A * | 12/1999 | McCarty et al. | ............... | 702/56 |
| 6,065,338 A * | 5/2000 | Stoiber et al. | ................. | 73/462 |
| 6,215,408 B1 * | 4/2001 | Leonard et al. | ............. | 340/644 |

(Continued)

FOREIGN PATENT DOCUMENTS

EP   0708391 A2   4/1996

(Continued)

*Primary Examiner*—Hezron Williams
*Assistant Examiner*—Samir M Shah
(74) *Attorney, Agent, or Firm*—Richard M. Goldberg (57) ABSTRACT

A vibration state detecting method at a machining stage of a work and/or tool, includes the steps of mounting the work and/or tool on a predetermined rotational device and measuring a deviation size and/or deviation average speed corresponding to each rotational number of the work and/or tool; presetting the deviation size and/or the deviation average speed measured by using the rotational device, a vibration amplitude and/or vibration average speed when each machine tool having a work and/or tool mounted thereon is rotated, with a common unbalance amount and at a rotational speed, and proportional fixed number of both thereof; and calculating a vibration amplitude and/or vibration average speed corresponding to each number of rotations when the work and/or tool is mounted on each machine tool by using a measurement value of the deviation size and/or deviation average speed of using rotational device, and the proportional fixed number.

11 Claims, 5 Drawing Sheets

U.S. PATENT DOCUMENTS

| | | | |
|---|---|---|---|
| 6,234,021 B1 * | 5/2001 | Piety et al. | 73/592 |
| 6,633,822 B2 * | 10/2003 | Maness et al. | 702/56 |
| 6,766,697 B1 * | 7/2004 | Perez et al. | 73/800 |
| 6,782,449 B1 * | 8/2004 | Codilian et al. | 711/113 |
| 7,250,935 B2 * | 7/2007 | Kubota et al. | 345/156 |
| 7,392,701 B2 * | 7/2008 | Turner et al. | 73/462 |
| 7,458,269 B2 * | 12/2008 | Loesl et al. | 73/660 |
| 7,701,501 B2 * | 4/2010 | Ito et al. | 348/335 |
| 2005/0060123 A1 * | 3/2005 | Schiltz et al. | 702/184 |
| 2005/0284226 A1 * | 12/2005 | Boda et al. | 73/660 |

FOREIGN PATENT DOCUMENTS

| | | | |
|---|---|---|---|
| JP | 54101378 A | * | 8/1979 |
| JP | 57076433 A | * | 5/1982 |
| JP | 60143727 A | * | 7/1985 |
| JP | 60152921 A | * | 8/1985 |
| JP | 61059221 A | * | 3/1986 |
| JP | 5-335801 | | 12/1993 |
| JP | 11-207551 | | 8/1999 |
| JP | 2002-515832 A | | 5/2002 |

\* cited by examiner fig 1

VIBRATION STATE DETECTING METHOD AT MACHINING STAGE OF WORK AND/OR TOOL

BACKGROUND OF THE INVENTION

1. Field of the Invention

The present invention relates to a method of detecting the degree of unbalance of a work and/or tool to be mounted on a machine tool and a vibration state corresponding to the number of rotations of the work and/or tool at the stage of operation.

2. Description of the Related Art

The positions of the rotational centers of a machine tool, a tool which performs a rotational work, and a work which is to be cut, formed or so by the tool may not match with the positions of the centers of gravity thereof, and it is not rarely the case that there is a minute distance-oriented deviation (difference) between the position of the rotational center and the position of the center of gravity.

Given that m is the mass of a work and/or tool, i.e., the mass of one or both of a work and a tool, r is a deviation-oriented distance between the rotational center and the center of gravity, centrifugal force given below acts on the work and/or tool by rotating at an angular velocity ω.

$$f = mr\omega^2$$

Figure 4:
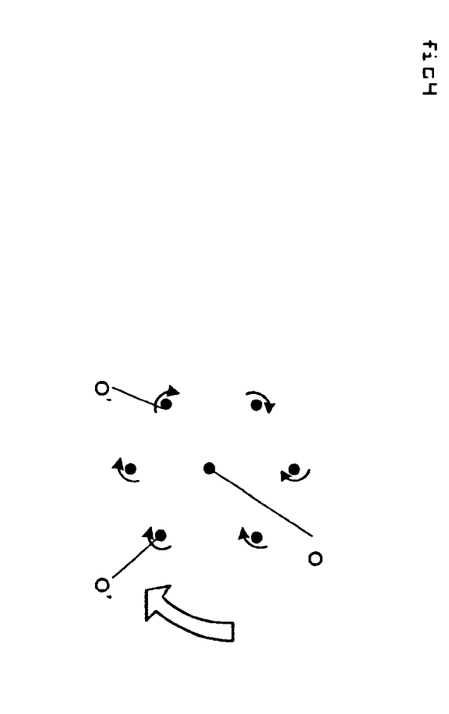
FIG. 4 is a plan view for explaining that the center position which is actually involved in the rotation of an unbalanced work and/or tool is revolving about the original center position (O representing the original rotational center position to be the center of the revolution, while O' represents the real rotational center position of rotation at an angular velocity ω while revolving)

Due to the action of the centrifugal force, the real rotational centers of the work and/or tool and a machine tool having the work and/or tool go to a revolving state through an approximately circular motion each about the original position of the rotational center, as shown in FIG. 4. The revolving position of the real rotational center, when observed in a specific direction, shows a vibrating state.

The product of the mass m of the work and/or tool which influences the centrifugal force and the deviation-oriented distance r is defined as an unbalance amount. As apparent from the fundamental equation of the centrifugal force, a vibration state originating from unbalance is inevitably influenced by the unbalance amount mr and the rotational angular velocity ω.

Conventionally, a vibration state originating from unbalance of a machine tool which has a work and/or tool mounted thereon and is rotating, specifically, the vibration amplitude and/or vibration average speed of vibration, are detected by arranging a direct optical device or an electromagnetic-induction based detecting device at the machine tool, as described in Patent Document 1 (Japanese Unexamined Patent Publication No. H6-335801) and Patent Document 2 (Japanese PCT Patent Publication No. 2002-515832).

However, the conventional detecting methods essentially require that a detecting device and a circuit needed for the detection should be provided for each machine tool, and are therefore very disadvantageous from the viewpoints of the effective use of space and the economical cost.

In addition, when a sensor fails, the repair should be carried out for each machine tool, which is significantly troublesome.

DISCLOSURE OF THE INVENTION

Problems to be Solved by the Invention

Accordingly, it is an object of the present invention to provide a method of detecting the vibration state of an unbalanced work and/or tool corresponding to each machine tool by using a rotational device common to the individual machine tools and without providing a detecting device for each machine tool.

To achieve the object, the present invention has following four basic structures.

(1) A vibration state detecting method at a machining stage of a work and/or tool for detecting a vibration state which is brought about due to unbalance of a work and/or tool mounted on a machine tool and rotating, comprising the steps of mounting the work and/or tool on a predetermined rotational device and optically measuring a deviation size and/or deviation average speed corresponding to each number of rotations of the work and/or tool; presetting, in a prior test, the deviation size and/or the deviation average speed measured by using the rotational device, a vibration amplitude and/or vibration average speed when each machine tool having a work and/or tool mounted thereon is rotated, with a common unbalance amount and at a rotational speed, and proportional fixed number of both thereof; and calculating a vibration amplitude and/or vibration average speed corresponding to each number of rotations when the work and/or tool is mounted on each machine tool by using a measurement value(s) of the deviation size and/or deviation average speed by using the rotational device, and the proportional fixed number.

(2) A vibration state detecting method at a machining stage of a work for detecting a vibration state which is brought about due to unbalance of a work mounted on a machine tool and rotating, comprising the steps of mounting the work and/or a tool on a predetermined rotational device and measuring a deviation average speed and/or deviation size corresponding to a number of rotations of the work and/or tool with electromagnetic induction; premeasuring, in a prior test, the deviation average speed and/or deviation size measured by using the rotational device, a vibration amplitude and/or vibration average speed when each machine tool having a work and/or tool mounted thereon is rotated, with a common unbalance amount and at a rotational speed, and proportional fixed number thereof; and calculating a vibration amplitude and/or vibration average speed corresponding to each number of rotations when the work and/or tool is mounted on each machine tool by using a measurement value(s) of the deviation average speed and/or deviation size by using the rotational device, and the proportional fixed number.

(3) A vibration state detecting method at a machining stage of a work for detecting a vibration state which is brought about due to unbalance of a work mounted on a machine tool and rotating, comprising the steps of mounting the work and/or a tool on a predetermined rotational device and optically measuring a deviation size corresponding to a number of rotations of the work and/or tool, the deviation average speed being measured with electromagnetic induction; premeasuring, in a prior test, the deviation size and the deviation average speed measured by using the rotational device, a vibration amplitude and vibration average speed when each machine tool having a work and/or tool mounted thereon is rotated, with a common unbalance amount and at a rotational speed, and proportional fixed number thereof; and calculating a vibration amplitude and vibration average speed corresponding to each number of rotations when the work and/or tool is mounted on each machine tool based on the measurement of the deviation size and/or deviation average speed by using the rotational device.

DESCRIPTION OF SYMBOLS 1 work and/or tool
2 rotational device
3 table
31 plate or pole secured to the table
4 ball screw
5 conversion support tool
51 rotational portion
52 fixed portion
6 rotating probe
7 light projector
8 photosensor
9 magnet
10 coil
11 voltmeter or ammeter

BEST MODE FOR CARRYING OUT THE INVENTION

A first basic structure will be described below.

A rotational device is mounted on an object fixed inevitably.

When centrifugal force acts on the object having the rotational device secured thereto due to rotation of the object integral with a work and/or tool and the rotational position of the rotational device is deviated by R from the original position, the inherent elastic force of the object to return to the original position against the centrifugal force acts, so that the magnitude of the elastic force can be expressed approximately as kR where k is a proportionality factor.

Because the centrifugal force f explained in the foregoing description of BACKGROUND OF THE INVENTION and the elastic force are balanced, the following equation is satisfied.

$$mr\omega^2 = kR \quad (a)$$

In the first basic structure, when vibration originating from the unbalance of the rotational device occurs, isogonic force is applied also to the object having the rotational device mounted thereon due to the centrifugal force, the object takes a circular motion caused by the revolution approximately at a radius R about the original rotational center position of the rotational device, as shown in FIG. 4. As a result, the real rotational center position of the rotational device rotates together with the work and/or tool while making the aforementioned revolution.

Figure 5:
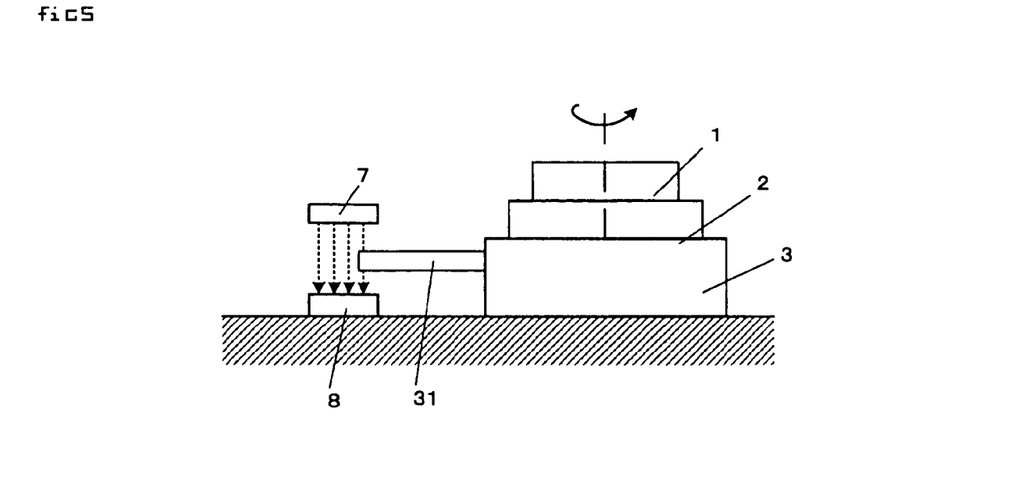
FIG. 5 is a side view showing the structure of an embodiment with a first basic structure.

In general, as shown in FIG. 5, a fixed table 3 is prepared as the object, and given that a rotational device 2 having a work and/or tool 1 mounted thereon is mounted on the table 3, vibration based on the approximate circular motion of the table 3 or a plate or pole 31 secured to the table 3 is optically measured in the first basic structure. (FIG. 5 shows a state where the vibration of the plate or pole 31 secured to the table 3 is measured.)

Given that, in the optical measurement, a direction orthogonal to the illumination direction of light is the x axis, the size of the deviation in the x-axial direction caused by the vibration of the table 3 is x, and the direction of the deviation in the initial stage (stage at t=0) is the x-axial direction, force $f_x$ of a component which moves the table 3 in the x-axial direction by the rotation of the rotational device 2 and the work and/or tool 1 satisfies the following expression.

$$f_x = f \cos \omega t = mr\omega^2 \cos \omega t$$

When the deviation in the x-axial direction based on the approximate circular motion of the table 3 is x, $$x = R \cos \omega t,$$

so that $$f_x = mr\omega^2 \cos \omega t = kx \quad (b)$$

is satisfied.

From the equation b, $$x = (mr\omega^2 \cos \omega t)/k \quad (c)$$

is derived. Given that the amplitude of the vibration of the table 3 at a vibration frequency ω/2π is A, $$A = mr\omega^2/k \quad (d)$$

can be eventually obtained.

When optical measurement is used, 2mrω2/k can be detected as the vibration amplitude from the center position of the vibration of the table 3 to both sides, so that ½ of the detected position corresponds to the deviation size of the vibration caused by the approximate circular motion occurring due to the rotation of the rotational device 2.

In the case of optical measure of the first basic structure, the normal deviation size is often a basic measurement value. In the case of the optical measure, however, a deviation average speed can be measured in association with each rotational angular velocity ω.

That is, from the equation c, a vibration speed V in the x-axial direction satisfies $$V = dx/dt = -mr\omega^3 \sin \omega t/k.$$

In this case, the average speed when the table 3 moves in a positive direction and a negative direction is obtained in the range of $$0 \leq \omega t \leq \pi$$

and in the range of $$\pi \leq \omega t \leq 2\pi.$$

As the average values of sin ωt in the ranges are 2/π and −2/π respectively, the following average value V of the deviation average speed based on the reciprocal vibration can be eventually acquired.

$$V=(2mr\omega^3)/(\pi k)=2\omega A/\pi \qquad (e)$$

In a case where a work and/or tool 1 with an unbalance amount mr is mounted on a specific machine tool, which rotates at the rotational angular velocity ω, the machine tool, similarly to the table 3 having the rotational device 2 and the work and/or tool 1 mounted thereon, takes an approximate circular motion, thus causing vibration based on the motion.

Every machine tool is fixed, so that $$mr\omega^2=k'R' \qquad (a')$$

is satisfied in a case where R' is the amount of the deviation of the rotational center position of the machine tool caused by the centrifugal force and k'R' is the force that tries to keep a balanced state against the centrifugal force caused by the unbalance and return the machine tool to the original state (k' being a proportionality factor similar to the k mentioned above).

Therefore, given that the vibration distance when a machine tool vibrates in a specific direction or in the x-axial direction is x', $$x'=mr\omega^2 \cos \omega t/k' \qquad (c')$$

can be acquired as in the case of (b).

Given that the amplitude of the vibration is A', $$A'=mr\omega^2/k' \qquad (d')$$

can be acquired as in the case of (d).

Given that the vibration average speed in the reciprocal vibration in the x-axial direction is V', $$V'=(2mr\omega^3)/(\pi k')=2\omega A'/\pi \qquad (e')$$

can be acquired as in the case of (e).

From the equations d and d', $$A'=(k/k')A=(k/k')\cdot \pi(V)/(2\omega)$$

is satisfied, so that the vibration amplitude A' when rotation is made by the machine tool can be calculated from a proportional equation derived by dividing the deviation average speed (V) by the rotational angular velocity ω as well as from a proportional equation with respect to the deviation size A when rotation is made by the rotational device.

From the equations e and e', $$V'=(k/k')(V)=(k/k')\cdot(2\omega/\pi)A$$

is satisfied, so that the vibration average speed V' in the vibration in a specific direction (x-axial direction) when unbalance is caused by the rotation of the machine tool can likewise be acquired from a proportional equation with respect to the deviation average speed V measured in terms of the rotation of the rotational device 2 and from a proportional equation derived by multiplying the deviation size A measured in terms of the rotation by the rotational angular velocity ω.

As apparent from the above, the vibration amplitude A' and/or the vibration average speed V' based on the unbalance of the work and/or tool 1 when a machine tool is rotated can be calculated by a proportional relational equation with respect to the vibration amplitude A and/or the deviation average speed V. However, the proportional fixed number in the calculation (πk/2k' on the premise that division involving k/k' and ω of the general equation is carried out, and 2k/πk' on the premise that multiplication involving πk/2k' and ω of the general equation is carried out) are to be set by measuring the deviation amplitude A and the deviation average speed V in a predetermined rotation of the rotational device 2, and directly measuring, on trial, the vibration amplitude A' and vibration average speed V' also for the machine tool (the measurement is possible in both a case of employing the optical measuring scheme as shown in the first basic structure, and a case of employing the electromagnetic-induction based measuring scheme as shown in the second basic structure).

Note that the rotational device 2 used in measuring the deviation size and the deviation average speed only needs to achieve the rotational angular velocity in the same range as that of each machine tool, and its standards are not particularly limited and a standard with a dimension smaller than that of each machine tool is sufficiently satisfactory.

It is also sufficiently possible to use a specific machine tool as the rotational device 2 (though such is unnecessary).

The proportional relationship between the positional deviation size A when rotation is based on the rotational device 2 and the vibration amplitude A' when rotation is based on a machine tool is not only generalization derived from the aforementioned equations, but also can be confirmed through an actual experiment.

The experiment-based confirmation is valid in the relationship between the deviation average speed (V) and the vibration average speed (V'), and is valid in the relationship between the deviation size (A) and the vibration average speed (V') in a state where the deviation size (A) is multiplied by the rotational angular velocity (ω), and further also valid in the relationship between the deviation average speed (V) and the vibration amplitude (A') in a state where the deviation average speed (V) is divided by the rotational angular velocity (ω)

Next, a second basic structure will be described.

Figure 6:
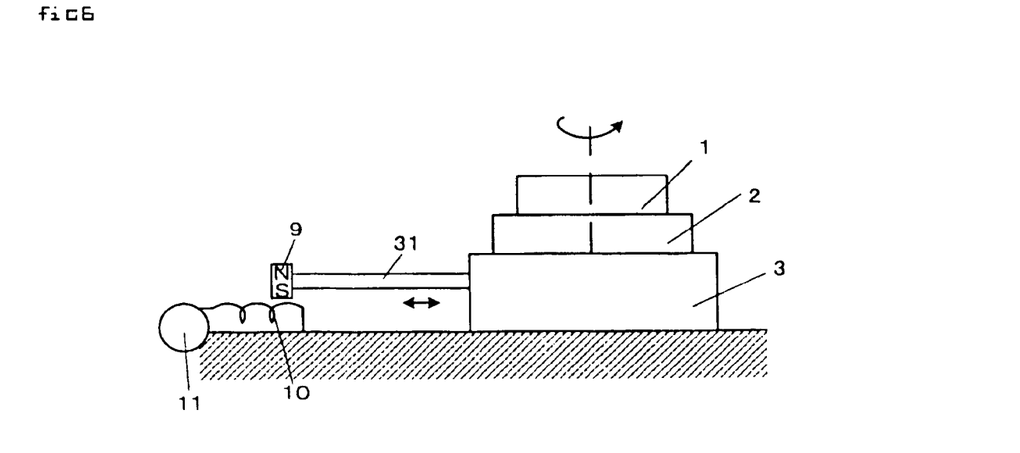
FIG. 6 is a side view showing the structure of an embodiment with a second basic structure.

The second basic structure differs from the first basic structure in that, in the measurement of the vibration amplitude and the deviation average speed using the rotational device 2, electromagnetic-induction based measurement is employed in place of the optical measurement of the first basic structure as shown in FIG. 6.

It is to be however noted that, in electromagnetic-induction based measurement, fundamentally, the moving speed of an object is directly detected, whereas the moving distance is not directly detected, as in the optical measurement.

As apparent from the Fleming's right-hand rule, when in a magnetic field with a magnetic flux B, a conductor wire having n turns and a length l in a direction orthogonal to the magnetic flux moves in a direction orthogonal to the magnetic flux and the lengthwise direction at a speed V, a voltage e generated across the conductor wire is $$e=nVlB,$$

which apparently shows that the electromagnetic-induction based measurement is directed to the detection of the moving speed V of a magnet or a conductor (coil 10).

In a case where the average moving speed V when the rotational device 2 having the work and/or tool 1 mounted thereon is mounted on the fixed table 3 is measured from the induced voltage e, the following proportionality relationship is satisfied $$e=c(V)$$

where c is a proportionality factor.

It is apparent from the equation e, that the average moving speed V satisfies $$V = 2\omega A/\pi$$

with respect to the deviation size A. Eventually, $$A = (\pi e)/(2\omega c)$$

is satisfied, so that the deviation size A can be electromagnetically measured with electromagnetic induction in a state of inverse proportion to the rotational angular velocity ω, with respect to the induced voltage e proportional to the average moving speed.

The step of calculating the vibration amplitude and/or the vibration average speed at the actual stage of rotating a machine tool by setting proportionality multipliers (there are a case of division and case of multiplication by ω) for the vibration amplitude and/or the vibration average speed, in a prior test, from the deviation size and the deviation average speed based on the rotation of the rotational device 2 is quite the same as the one involved in the first basic structure.

Figure 7:
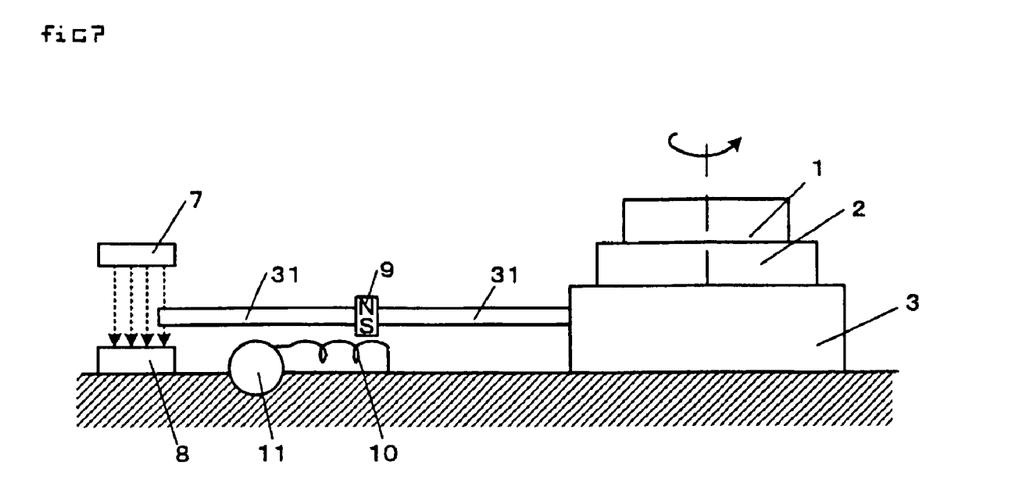
FIG. 7 is a side view showing the structure of an embodiment with a third basic structure.

As shown in FIG. 7, a third basic structure employs optical measurement for the deviation size according to the rotation of the rotational device 2, and employs electromagnetic-induction based measurement for the deviation average speed. In this case, the vibration amplitude A' and the vibration average speed V' for each machine tool can be calculated directly from the deviation size A and the deviation average speed V based on the each proportionality factor (k/k'), thus ensuring speedy detection of a vibration state.

EXAMPLES

Examples will be described below.

Example 1

Figure 1:
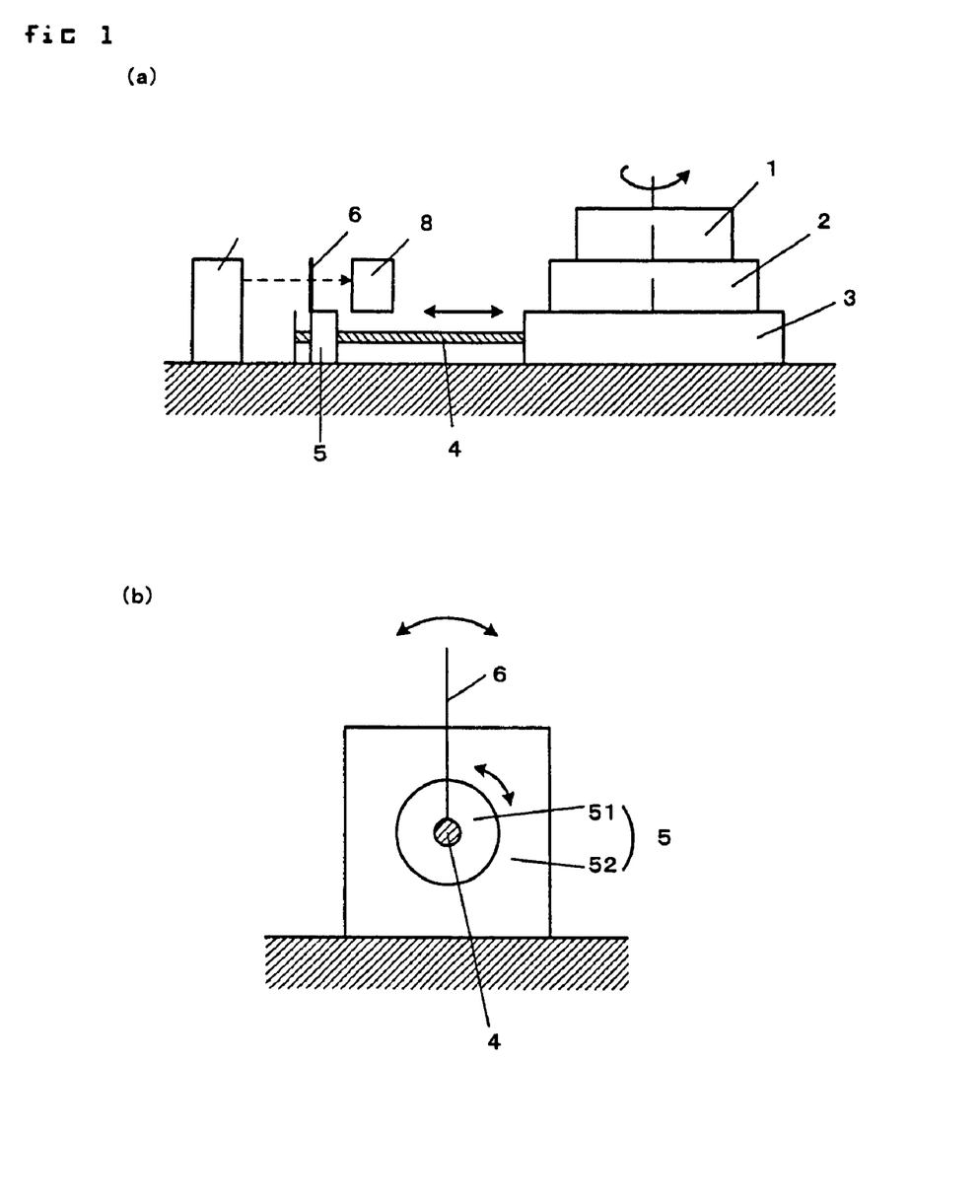
FIG. 1A is a side view of Example 1.
FIG. 1B is a front view of a probe which performs rotational vibration, both showing the structure of the Example 1.

Example 1 is characterized in that in the first basic structure, as shown in FIG. 1, the ball screw 4 which secures the rotating probe 6 is coupled to the table 3 and the deviation size and/or the deviation average speed is measured in terms of the reciprocal vibration of the rotating probe 6.

That is, in the Example 1, linear vibration is converted to a reciprocal rotational vibration via the ball screw 4, and the positional deviation size and/or the deviation average speed is detected by the angular width of the rotational vibration.

While the width of the vibrating angle can be detected by projection of light orthogonal to the angular direction, setting the reciprocal rotational width of the rotating probe 6 to be larger than the amount of the linear movement can ensure accurate measurement.

Example 2

Figure 2:
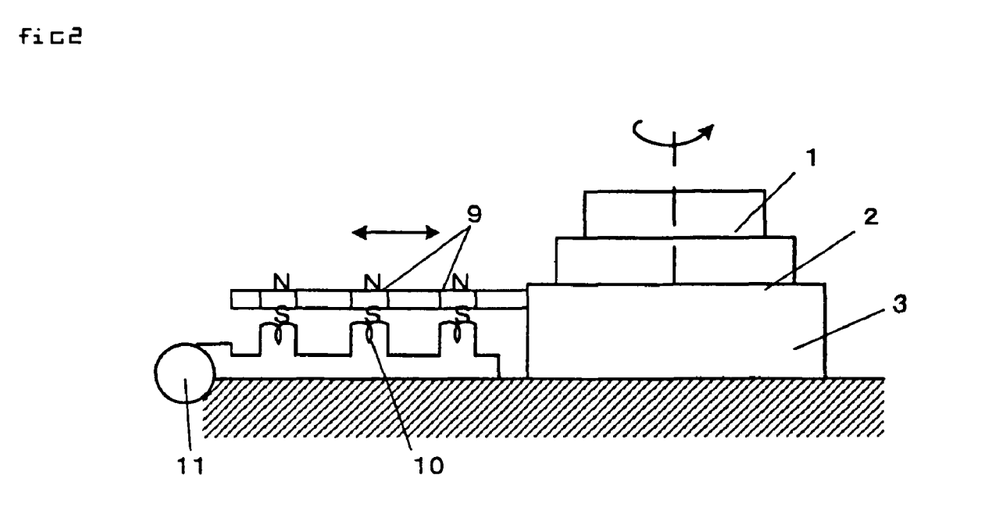
FIG. 2 is a side view showing the structure of Example 2.

Example 2 is characterized in that in the second basic structure, as shown in FIG. 2, the rotational device 2 is mounted on the table 3 having a plurality of magnets 9 and power generating coils 10 being secured near the magnets 9 in connection to one another in association with the respective magnets 9, to thereby measure the deviation average speed and/or deviation size of the table 3.

That is, in the Example 2, the magnets 9 which are coupled to the table 3 and can enable a plurality of linear vibrations, and the fixed coils 10 respectively corresponding to the respective magnets 9 are arranged to generate induced voltages, thereby permitting detection of the linear deviation average speed and/or deviation size.

In a case where a plurality of magnets 9 and coils 10 are used and individual induced voltages are added, it is possible to cancel an error in the individual induced voltages and accurately measure the deviation average speed and/or deviation size.

Example 3

Figure 3:
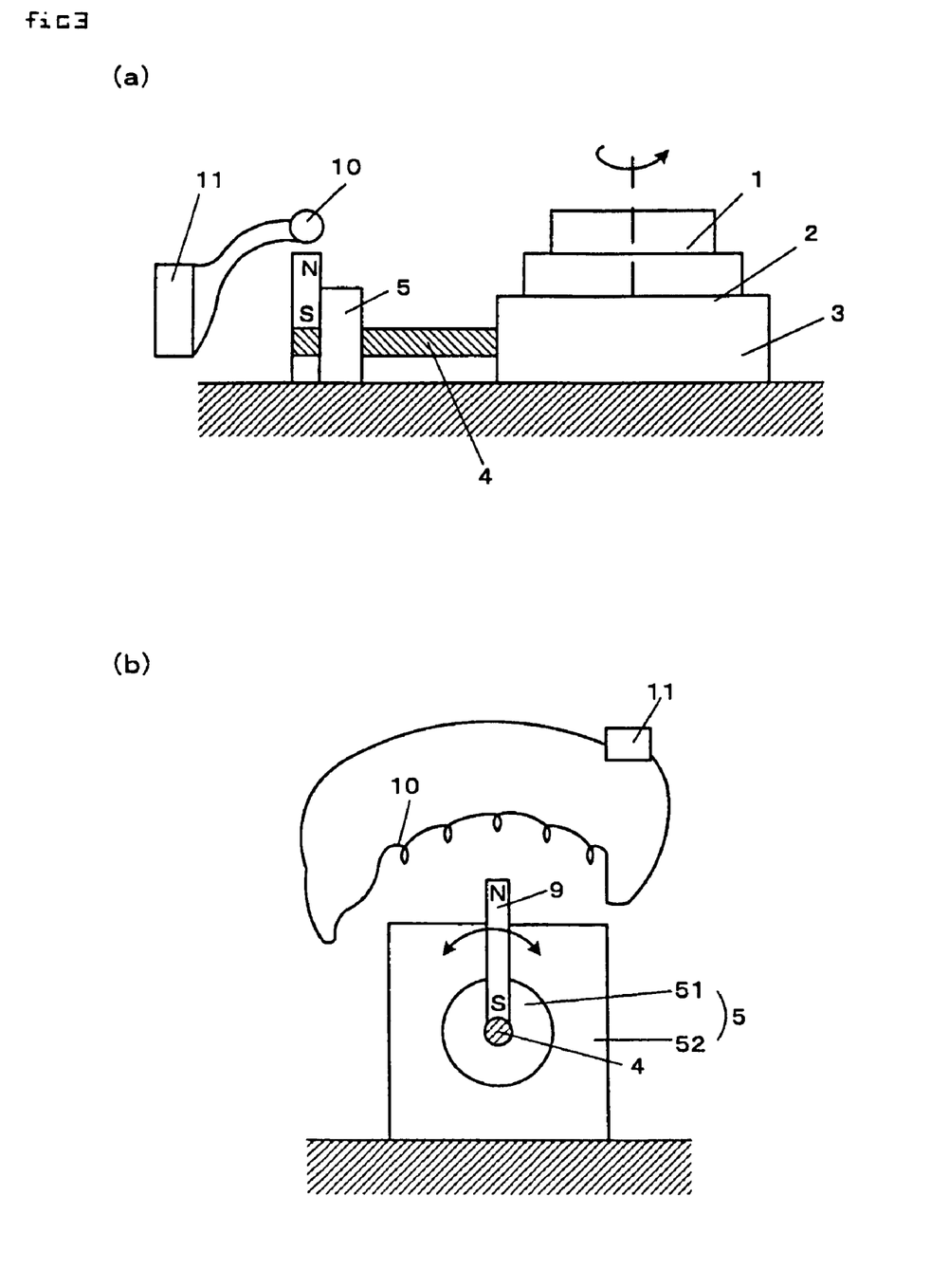
FIG. 3A is a side view of Example 3.
FIG. 3B is a front view of a rotating magnet and a coil disposed therearound, both showing the structure of the Example 3.

Example 3 is characterized in that in the second basic structure, as shown in FIG. 3, the ball screw 4 having a rotating magnet secured thereto is coupled to the table 3, and a fixed coil 10 is disposed around the rotating magnet 9, so that the deviation average speed and/or deviation size of the table 3 in the direction of the ball screw 4 is measured in terms of the amount of power generated from the fixed coil 10 due to the reciprocal vibration of the rotating magnet 9.

That is, the Example 3 is common to the Example 1 in that linear vibration is converted to rotational vibration via the ball screw 4, but, in the Example 3, the deviation size and/or deviation average speed of the rotational vibration is measured in terms of a voltage induced based on a change in the magnetic flux crossing the surrounding coil 10 by the reciprocal rotational vibration within a predetermined angular range of the magnet 9.

In the Example 3, setting the reciprocal rotational vibration of the magnet 9 to be larger than the amount of the linear movement can also ensure accurate measurement.

Example 4

Example 4 is characterized in that in the third basic structure, the deviation size is measured based on either the method of the embodiment illustrated in FIG. 5 or the method of the Example 1 illustrated in FIG. 1, and the deviation average speed is measured according to either the method of the Example 2 illustrated in FIG. 2 or the method of the Example 3 illustrated in FIG. 3.

That is, the Example 4 can specifically realize the third basic structure that independently converts the vibration amplitudes and the vibration average speeds of individual machine tools based on proportional fixed number for the respective machine tools by measuring the deviation sizes and deviation average speeds independently, thereby achieving speedy calculation and detection.

EFFECT OF THE INVENTION

According to the present invention with the basic structures, it is possible to easily detect the vibration amplitude and/or vibration average speed based on proportional fixed number calculated in a prior test conducted for each machine tool and easily execute succeeding controls on each machine tool based on the detection, both by measuring the deviation size and/or the deviation average speed using a predetermined rotational device and the optical measurement method in the rotational device, and/or the electromagnetic-induction based measurement method.

In addition, in a case where the ratio of proportional fixed number for the individual machine tools to one another is known, when the vibration amplitude and/or vibration average speed for a specific machine tool is known, the amounts of those parameters for another machine tool can be calculated quickly.

A variety of applications of the present invention are feasible at the site where a rotating machine tool is used.

What is claimed is:

1. A vibration state detecting method at a machining stage of at least one of a work and a tool for detecting a vibration state which is brought about due to unbalance of the at least one of the work and the tool mounted on a machine tool and rotating, comprising the steps of:
   mounting the at least one of the work and the tool on a predetermined rotational device;
   optically measuring at least one of a deviation size and deviation average speed corresponding to each number of rotations of the at least one of the work and the tool;
   presetting, in a prior test,
      at least one of the deviation size and the deviation average speed measured by using the rotational device, and
      at least one of a vibration amplitude and vibration average speed when each machine tool having the at least one of the work and the tool mounted thereon is rotated, with a common unbalance amount and at a rotational speed, and proportional fixed number of both thereof; and
   calculating at least one of a vibration amplitude and vibration average speed corresponding to each number of rotations when the at least one of the work and the tool is mounted on each machine tool by using at least one measurement value of the at least one of deviation size and deviation average speed by using the rotational device, and the proportional fixed number.

2. The vibration state detecting method according to claim 1, further comprising the steps of:
   mounting the rotational device on a predetermined table, and
   measuring at least one of a deviation size and deviation average speed of one of the following:
      the table,
      a plate on the table, and
      a pole secured to the table.

3. The vibration state detecting method according to claim 2, further comprising the steps of:
   coupling together a ball screw having a rotating probe secured thereto and the table, and
   measuring at least one of the deviation size and deviation average speed in terms of reciprocal vibration of the rotating probe.

4. A vibration state detecting method at a machining stage of a work for detecting a vibration state which is brought about due to unbalance of a work mounted on a machine tool and rotating, comprising the steps of:
   mounting at least one of the work and the tool on a predetermined rotational device;
   measuring at least one of a deviation average speed and deviation size corresponding to a number of rotations of the at least one of the work and the tool with electromagnetic induction;
   premeasuring, in a prior test,
      at least one of the deviation average speed and deviation size measured by the rotational device, and
      at least one of a vibration amplitude and vibration average speed when each machine tool having the at least one of the work and the tool mounted thereon is rotated, with a common unbalance amount and at a rotational speed, and proportional fixed number thereof; and
   calculating at least one of a vibration amplitude and vibration average speed corresponding to each number of rotations when the at least one of the work and the tool is mounted on each machine tool by using at least one measurement value of the at least one of deviation average speed and deviation size with the use of the rotational device, and the proportional fixed number.

5. The vibration state detecting method at a machining stage of the work according to claim 4, further comprising the steps of:
   mounting the rotational device on a table having a plurality of magnets, and
   securing power generating coils near the magnets in connection to one another in association with the respective magnets, to thereby measure at least one of a deviation average speed and deviation size of the table.

6. The vibration state detecting method at a machining stage of the work according to claim 4, further comprising the steps of:
   coupling together a ball screw having a rotating magnet secured thereto and a table,
   disposing a fixed coil around the rotating magnet, and
   measuring at least one of a deviation average speed and deviation size of the table in a direction of the ball screw in terms of an amount of power generated from the fixed coil due to a reciprocal vibration of the rotating magnet.

7. A vibration state detecting method at a machining stage of a work for detecting a vibration state which is brought about due to unbalance of a work mounted on a machine tool and rotating, comprising the steps of:
   mounting at least one of the work and the tool on a predetermined rotational device;
   optically measuring a deviation size and deviation average speed corresponding to a number of rotations of the at least one of the work and the tool, the deviation average speed being measured with electromagnetic induction;
   premeasuring, in a prior test,
      the deviation size and the deviation average speed measured by the rotational device, and
      a vibration amplitude and vibration average speed when each machine tool having the at least one of the work and the tool mounted thereon is rotated, with a common unbalance amount and at a rotational speed, and proportional fixed number thereof; and
   calculating a vibration amplitude and vibration average speed corresponding to each number of rotations when the at least one of the work and the tool is mounted on each machine tool by using at least one measurement value of at least one of the deviation size and deviation average speed with the use of the rotational device, and the proportional fixed number.

8. The vibration state detecting method according to claim 7, wherein:
   the step of measuring the deviation size, includes the steps of:
      mounting the rotational device on a predetermined table, and
      measuring the deviation size of one of the following:
         the table,
         a plate on the table, and
         a pole secured to the table; and
   the step of measuring the deviation average speed includes the steps of:
      mounting the rotational device on the table having a plurality of magnets, and
      securing power generating coils near the magnets in connection to one another in association with the respective magnets, to thereby measure at least one of a deviation average speed and deviation size of the table.

9. The vibration state detecting method according to claim 7, wherein:
   the step of measuring the deviation size, includes the steps of:
      coupling together a ball screw having a rotating probe secured thereto and a table, and
      measuring at least one of the deviation size and deviation average speed in terms of reciprocal vibration of the rotating probe; and
   the step of measuring the deviation average speed includes the steps of:
      mounting the rotational device on a table having a plurality of magnets, and
      securing power generating coils near the magnets in connection to one another in association with the respective magnets, to thereby measure the deviation average speed of the table.

10. The vibration state detecting method according to claim 7, wherein:
   the step of measuring the deviation size, includes the steps of:
      mounting the rotational device on a predetermined table, and
      measuring the deviation size of one of the following:
         the table,
         a plate on the table, and
         a pole secured to the table; and
   the step of measuring the deviation average speed includes the steps of:
      coupling together a ball screw having a rotating magnet secured thereto and the table, and
      disposing a fixed coil around the rotating magnet, and whereby
      measuring at least one of a deviation average speed and deviation size of the table in a direction of the ball screw in terms of an amount of power generated from the fixed coil due to a reciprocal vibration of the rotating magnet.

11. The vibration state detecting method according to claim 7, wherein:
   the step of measuring the deviation size, includes the steps of:
      coupling together a ball screw having a rotating probe secured thereto and a table, and
      measuring at least one of the deviation size and deviation average speed in terms of reciprocal vibration of the rotating probe; and
   the step of measuring the deviation average speed includes the steps of:
      coupling together a ball screw having a rotating magnet secured thereto and the table, and
      disposing a fixed coil around the rotating magnet, and whereby
      measuring at least one of a deviation average speed and deviation size of the table in a direction of the ball screw in terms of an amount of power generated from the fixed coil due to a reciprocal vibration of the rotating magnet.

* * * * *